United States Patent
Chelchowski et al.

(10) Patent No.: US 7,178,838 B2
(45) Date of Patent: Feb. 20, 2007

(54) NUT AND TAIL ASSEMBLY

(75) Inventors: David Chelchowski, Largs Bay (AU); Geoffrey B. Puckett, Hallet Cove (AU)

(73) Assignee: Philmac Pty Ltd, North Plympton (AU)

( * ) Notice: Subject to any disclaimer, the term of this patent is extended or adjusted under 35 U.S.C. 154(b) by 0 days.

(21) Appl. No.: 10/494,496

(22) PCT Filed: May 29, 2003

(86) PCT No.: PCT/AU03/00651

§ 371 (c)(1),
(2), (4) Date: May 4, 2004

(87) PCT Pub. No.: WO03/102456

PCT Pub. Date: Dec. 11, 2003

(65) Prior Publication Data

US 2004/0251687 A1    Dec. 16, 2004

(30) Foreign Application Priority Data

May 31, 2002    (AU) ...................... PS2671

(51) Int. Cl.
*F16L 17/00*    (2006.01)
(52) U.S. Cl. ...................... 285/354; 285/388
(58) Field of Classification Search .................. 285/52, 285/386–388, 384, 247, 354, 272, 906
See application file for complete search history.

(56) References Cited

U.S. PATENT DOCUMENTS

| | | | | |
|---|---|---|---|---|
| 1,610,414 A | * | 12/1926 | Bernard et al. ............. | 285/384 |
| 3,115,354 A | * | 12/1963 | Bowan et al. ............... | 285/52 |
| 4,575,044 A | * | 3/1986 | Gentry ........................ | 285/388 |
| 4,623,123 A | * | 11/1986 | Traylor ....................... | 285/388 |
| 4,887,852 A | * | 12/1989 | Hancock ..................... | 285/354 |
| 6,170,890 B1 | | 1/2001 | Ohmi et al. | |

FOREIGN PATENT DOCUMENTS

| | | |
|---|---|---|
| AU | B-73454/81 | 7/1981 |
| AU | A-38626/85 | 8/1985 |
| DE | 3424-792 A | 7/1984 |
| EP | 0 945 663 A2 | 9/1999 |
| JP | 10259888 A | 3/1997 |

* cited by examiner

*Primary Examiner*—Aaron Dunwoody
(74) *Attorney, Agent, or Firm*—Sand & Sebolt

(57) ABSTRACT

A nut and tail assembly (10) and method of manufacture including a nut (12) having a first end and an inward flange (24) at the other end, a longitudinal cylindrical hollow body (14) having a first end and a second end at which is located an outstanding flange (40) and a circular longitudinal sleeve (16). The sleeve (16) extends along said sliding surface and has a flange (44) at a first end abutting against the body flange (24). A stop (34) is located between the ends of the body (14) and defines a cavity sliding surface generally parallel to the longitudinal body between the stop (34) and flange (44). The nut inward flange (24) extends into the body cavity and is of a large enough diameter to be able to slide on said body sliding surface but small enough to be held within said cavity defined between said stop (34) and sleeve flange (44). Projections (50) on the sleeve flange (44) assist in locating the sleeve (16) relative to the nut (12) during the moulding process.

15 Claims, 4 Drawing Sheets

NUT AND TAIL ASSEMBLY

The present invention relates to a pipe or conduit assembly or fitting including an outer member rotatable over an inner member said inner member including a rigid outer sleeve extending over a part of said tail assembly, and to a method of production thereof including any dies for the production of such a fitting.

BACKGROUND OF THE INVENTION

Nut and tail assemblies are typically moulded from plastics material, the typical assembly including a tail having an external thread at one end and an outstanding flange or lip at the other end with a stem extending therein between, said assembly also including a nut having an inturned flange that bears against the back of the tail outstanding flange and is arranged to firmly retain the assembly to a male threaded fitting. These fittings can be made many ways such as spin-welding or two-part operations. Other conduit fittings such as barrel unions, and fittings on the ends of valves can be made by the same methods.

In a previous patent by the same applicant, Australian Patent 579,134, whose contents are expressly incorporated by reference herein, there was disclosed both a method and a fitting manufactured by said method that greatly simplified the construction of such a fitting having a nut and tail of moulded plastics material. The method included placing the nut in a die and moulding the tail with the nut in one single die operation so that the tail outstanding flange was moulded within the body of the nut, the nut inturned flange located behind the outstanding flange of the tail. Such a method and fitting greatly simplified the then known manufacturing processes.

Although the fitting as described in the aforementioned patent has been found to work satisfactorily in most circumstances it has been found that lateral twisting and bending of such a fitting can cause failure in the fitting especially in the body of the tail or stem immediately adjacent the inturned flange of the nut. In situations where such a fitting may be prone to lateral forces this type of fitting is therefore unsuitable.

It is an object of the present invention to propose improvements in such a fitting and construction thereof whereby there is proposed a fitting having a nut, a tail of moulded plastics material, a sleeve extending at least partially over said tail and formed of a resilient material.

It is a further object of the preset invention to provide for improvements in the construction of such a fitting or at least provide the public with a useful alternative.

SUMMARY OF THE INVENTION

Therefore in one form of the invention there is proposed a nut and tail assembly including:
a longitudinal cylindrical hollow body having a first end, said body including an outwardly extending stop located inwardly from said first end, said body further having an outstanding flange at the second end thereof, said stop and flange defining therein between a cavity sliding surface generally parallel to the longitudinal body;
a circular longitudinal sleeve extending along said sliding surface;
a nut having a first end, and an inward flange at the other end, said nut inward flange extending into said body cavity and being of a diameter to be able to slide on said body sliding surface.

In a further form of the invention there is proposed a nut and tail assembly including:
a longitudinal cylindrical hollow body having a first end, said body including an outwardly extending stop located inwardly from said first end, said body further having an outstanding flange at the second end thereof, said stop and flange defining therein between a cavity sliding surface generally parallel to the longitudinal body;
a circular longitudinal sleeve extending along said sliding surface and having a flange at a first end thereof, said flange abutting against said body flange;
a nut having a first end, and an inward flange at the other end, said nut inward flange extending into said body cavity and being of a diameter to be able to slide on said body sliding surface.

In preference said body first end includes a plurality of external threads. Of course other types of connections including snap-on type fitting could well be employed.

Preferably said nut includes a plurality of internal threads at said first end.

In preference said sleeve other end extends into said body. It is therefore anchored into the body and is integral with the body.

In preference said sleeve other end includes at least one groove wherein said groove assist in longitudinally anchoring said sleeve in said body.

In preference said body is manufactured from polymeric plastic. This enables it to be moulded in a die operation.

In preference said sleeve is manufactured from metal. This may include various metals such as brass that then give the fitting strength against bending and twisting.

In preference said sleeve includes projections extending longitudinally outwardly from said flange. These projections help located the sleeve before moulding.

In preference said projections are located symmetrically and circumferentially on said flange.

In preference there are at least four said projections. These projections may be small pin-like projections although they may equally well be blocks.

Preferably located in between said sleeve and said external threads is a torque converter to assist in controlling the rotational motion of the body including said tail and sleeve.

In preference the assembly includes a gasket housed within said nut and abutting against said body outstanding flange.

In a yet further form of the invention there is proposed a method of manufacture of a fitting with an inner member having a sleeve and an outer member that is rotatable over said sleeve, the method including the steps of:
(a) making the outer member to a shape that includes a radially inturned annular flange at one end and an axially extending portion having an internal thread,
(b) placing a sleeve within said outer member, said sleeve having a radial outwardly extending annular flange, said sleeve flange abutting against said outer member flange and extending longitudinally away from said internal thread,
(c) positioning the outer member and sleeve onto an axially aligned male portion of a moulding die and within two female portions said male portion including a plurality of locating pins engaging said sleeve,
(d) closing the moulding die thereby placing the outer member and sleeve in their final position and establishing a moulding cavity within which is located the outer member and sleeve, part of the surface of said cavity defined by the outer surface of the sleeve annular flange, part of which is defined by the sleeve inner surface, part of which is defined by inner surfaces of the female die portions, and part of which is defined by surfaces of the male die portions.

In preference the method of manufacture includes making the outer member by moulding or machining operations.

In preference in the method of manufacture the moulding cavity is so shaped that the length of the inner member not adjacent said sleeve flange is longer to allow for shrinkage of the inner member during cooling.

In a still further form of the invention there is proposed a die for moulding of the tail of a nut and tail assembly having a sleeve, said die including two separable complementary female die portions having inner surfaces defining a recess, and at least one male die portion characterised in that the die moulding cavity is defined partly by the outer surface of the annular flange of said sleeve when inserted into said recess, partly by the recess surfaces of the female die members, partly by the inner surface of said sleeve, and partly by a surface of the male die portion.

In a yet further form of the invention there is proposed a fluid connector including:
a longitudinal hollow body having a first connection means at one end thereof, an outward flange at the other end thereof, and a stop located in between said ends;
a cylindrical sleeve located on top of said body between said outward flange and said stop
the diameter of said outward flange and said stop being greater than the diameter of the body between the two;
a nut having a second connection means at one end and a radially extending inward flange at the other end, said inward flange located between and of a smaller diameter than said body stop and outward flange.

In preference said nut inward flange diameter is only slightly larger than the diameter of the sleeve enabling said nut to slide along said sleeve.

In preference said first connection means are external threads and said second connection means are internal threads.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings.

DESCRIPTION OF THE PREFERRED EMBODIMENTS

Figure 1:
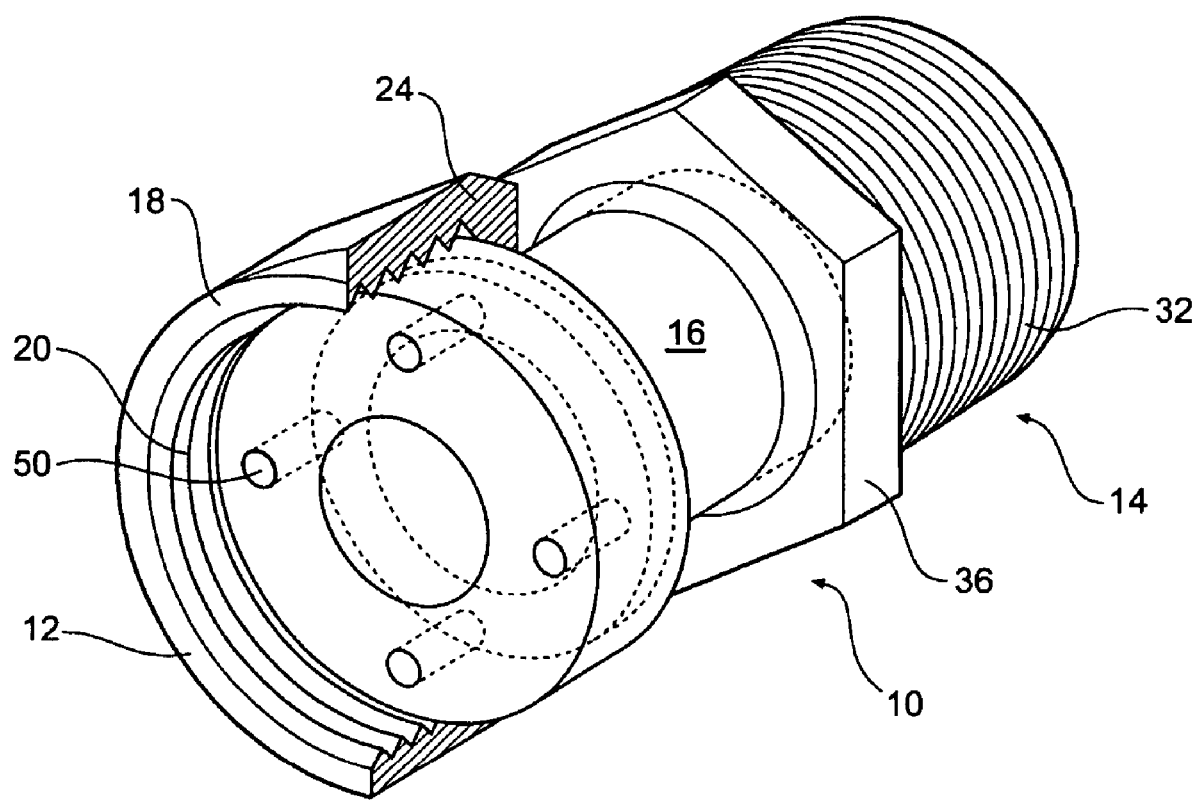
FIG. 1 is a perspective view of a moulded fitting embodying the present invention and including a nut, tail, and sleeve.
Figure 2:
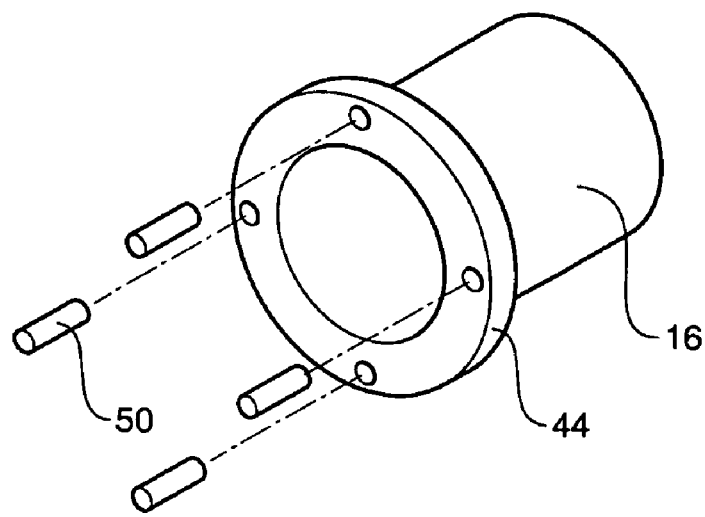
FIG. 2 is a perspective view of the sleeve of FIG. 1.
Figure 3:
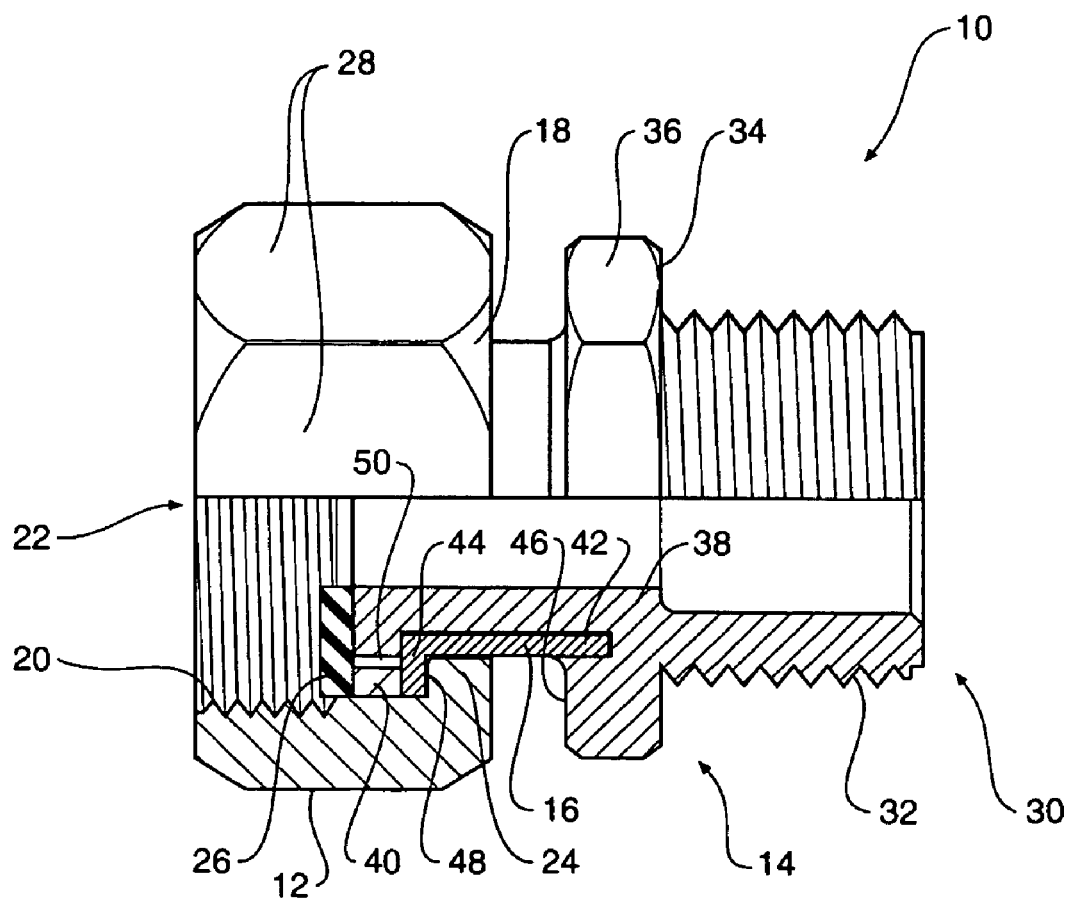
FIG. 3 is a cross-sectional view of the moulded fitting of FIG. 1 embodying the present invention.

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

Referring to the Figures there is shown a fitting 10 including a nut 12, tail 14, and sleeve 16. Nut 12 includes a body 18 having internal threads 20, bore 22 at one end, and a radially inturned flange 24 at the other end. The internal threads 20 are adapted to engage external threads of a suitable device such as a water meter or similar device. An O-ring, washer, or gasket 26 is used within the nut 12 for sealing engagement with such device.

The outer surface of the nut 12 is of a non-circular shape 28 to enable a tool, such as a wrench, to be used to tighten the nut 12 upon application.

The tail 14 includes a longitudinal body 30 having external threads 32 at one end thereof, an outwardly extending integrally formed torque converter 34 having a polygonal outer surface 36 assisting engagement of the converter 34 with an appropriate tool such as a wrench (not shown) that can be used to rotate the tail 14.

The tail 14 includes a stem 38 extending from the torque converter 34 longitudinally away from the external threads 32 and having an outwardly extending radial flange 40. The flange 40 may include a shoulder (not shown) for retention of the gasket 26.

The sleeve 16 extends along the outer surface 42 of the tail 30 between the torque converter 34 and the flange 40, the sleeve 16 at one end including radially outward flange 44 that is correspondingly shaped to nestle in flange 40 of the tail stem 38. The other end of the sleeve 16 extends into the tail body 30 under the torque converter 34.

The diameters of the stem 38, sleeve 16, and the nut flange 24 are chosen so that the nut 12 can freely slide alongside the sleeve 16. That is, the inner diameter of the nut flange 24 is greater than the outer diameter of the sleeve 16. At the same time, the outer diameter of the outward flange 44 is greater than the inner diameter of the nut flange 40 so that the nut 12 remains captured and can slide alongside the stem 16 between the torque converter inner surface 46 and the inner surface 48 of the outward flange 44 of the sleeve 16.

In the method of manufacture of the nut and tail assembly 10, location pins 50 are used to hold the sleeve 16 in place before moulding to thereby lock the sleeve 16 in position on the stem 38 with the sleeve 16 partially extending into the tail 30. As illustrated in FIG. 1, four pins 50 may be used, although it is to be understood that more or less may be used depending on the size of the sleeve and assembly. It is to be understood that the pins 50 may be integral with the sleeve 16, although they are typically part of the die arrangement. If part of the die arrangement, as the pins are removed, small apertures are left in the flange 40 of the stem 38.

Figure 4:
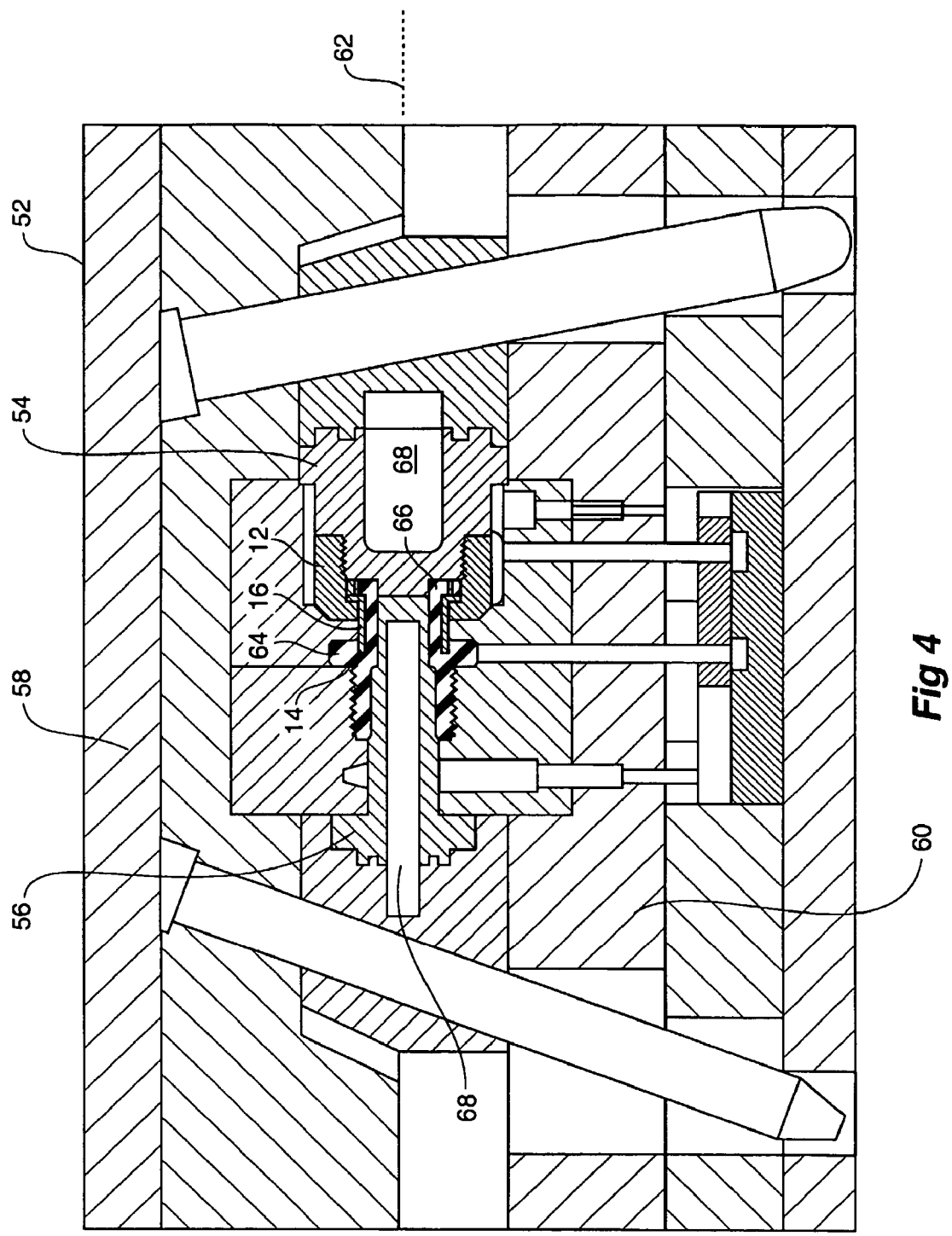
FIG. 4 is a longitudinal cross-sectional view illustrating the die used in the manufacture of the fitting or conduit.

FIG. 4 illustrates a die 52 that is used in the method of manufacture of the nut and tail assembly 10 according to the present invention. The die 52 is provided with four parts, a front male portion 54, a rear male portion 56 that upon die closure abuts the front male portion 54, and two female portions 58 and 60 which, upon closure, abut each other on an axial plane 62.

When the female portions 58 and 60 are closed they define a cavity or recess 64.

In the manufacture of the assembly 10, however, sleeve 16 is firstly inserted into nut 12 so that flanges 40 and 44 abut against each other. The nut 12, with the sleeve 16 extending outwardly is then positioned in the front male portion 54 of the die 52 that includes locating pins 50. The locating pins 50 are advantageous for a number of reasons. Firstly, they ensure that the sleeve longitudinal axis is generally parallel to the axis 62. They also ensure that during the moulding operation the nut flange 24 abuts the sleeve flange 44 so that the determined thickness of the moulded plastic on the sleeve flange 44 is achieved. Otherwise, if the sleeve 16 were to move axially towards the nut flange 24 during the moulding operation this thickness may be reduced leading to an unacceptable assembly where the sleeve 16 is not supported within the tail 30.

When the female portions 58 and 60 are then closed they bear against the outer surfaces of the nut 12 and a portion of the sleeve 16 establishing a moulding cavity 66. The moulding cavity 66 is therefore defined by the surface or boundary of recess 64, partially by the front and rear male portions 54 and 56 adjacent their mutual abutment zone, partially defined by the inner surface of the annular nut flange 24 and partially defined by the sleeve 16.

The die 52 is typically formed from tool steel and is provided with cooling conduits 68 therein. The die cavity, in which the tail forms flange 40, may have an additional shoulder recess (not shown) for retention of a sealing ring, typically an O-ring (not shown). In the case of an O-ring, the tail may also include an overhang to capture the O-ring in position (not shown).

Fluent plastics material is injected into the die cavity 66. However the nut 12 is cold, and the die portions are rapidly cooled by the cooling effect of the fluid flowing through the conduits 68. The die portions are then separated, and the nut 12 and the sleeve 16 remain captive on the front end of the tail 14 due to the outstanding flange portions 24 and 44 of the nut 12 and sleeve 16 and the outstanding flange portion 40 of the nut stem 38 that, by its moulding, is of a complementary shape to the inner surface of the nut and sleeve flange 24 and 44. The sleeve 16 is also captive since its other end, that is the end opposite to its flange, is now captured within the stem 38 of the tail 30.

It will now be readily apparent to the reader that the present invention ensures that there is provided a nut and tail assembly that has a sleeve that improves upon the integral strength of the assembly. Further, the process of manufacture that includes the pins ensures that the assembly can be repeatedly made whilst ensuring quality standards.

The sleeve is typically made from metal such as brass that has the necessary strength to provide for support of the rest of the fitting.

Figure 5:
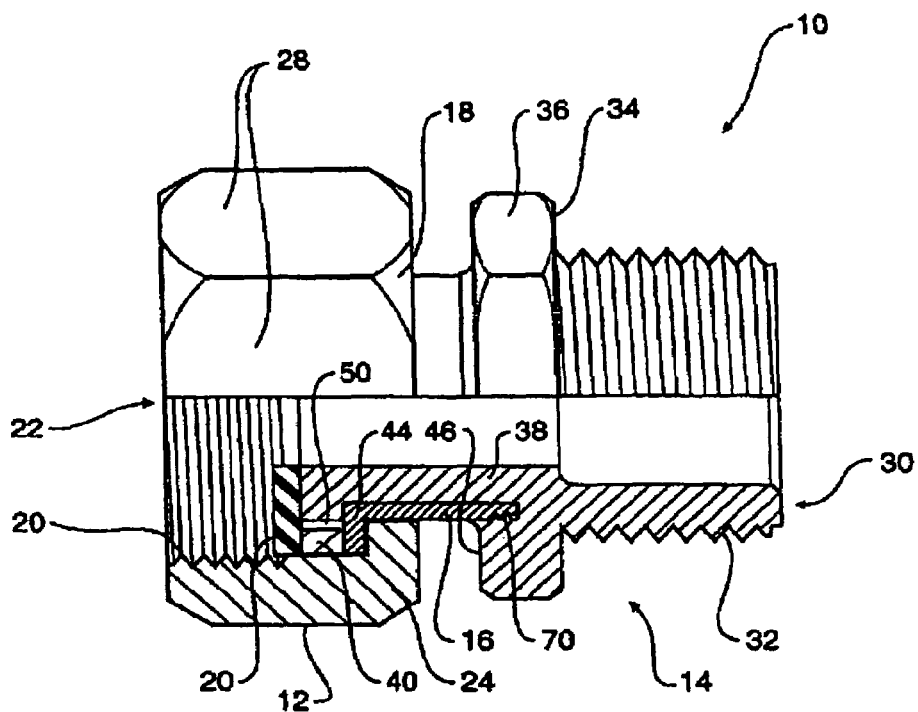
FIG. 5 is a cross-sectional view of a moulded fitting having an alternate configuration of a sleeve, according to the present invention.

In an alternate embodiment of the present invention and as illustrated in FIG. 5 is an assembly including sleeve 16, the sleeve at its outer end opposite to flange 44 including annular grooves 70. These grooves 70 located at the end of the sleeve opposite the flange 44 are embedded within the stem 38 of the tail 14. During the moulding operation, the grooves 70 are filled with plastic that, when cools, integrally locks the sleeve 16 to the stem 38 thereby providing additional support against longitudinal movement between the two. Of course, instead of grooves the sleeve may very well have projections around which forms the body during moulding.

Figure 6:
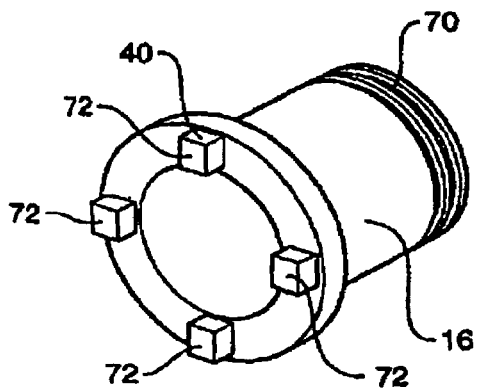
FIG. 6 is a perspective view of a sleeve having yet a further alternate configuration and including integrally formed locating projections.

In the embodiment discussed so far, locating pins 50 were positioned on the die. However, not only do the locating features need not be pins, but they may in fact be projections that are integrally formed in the sleeve 16. Illustrated in FIG. 6 is such an arrangement where locating blocks projections or blocks 74 are part of the sleeve 16. This may occur, for example, where one is using suitably strong plastic material, not necessarily metal, the sleeve 16 also being able to be produced as part of a moulding operation.

Figure 7A:
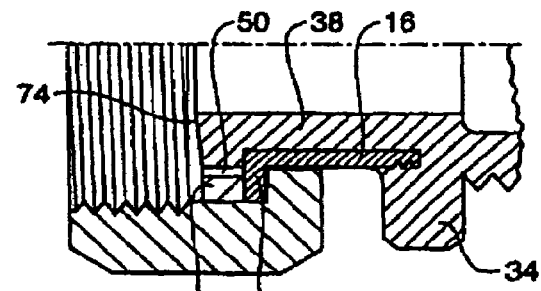
FIG. 7(*a*) is a partial cross-sectional view of the sleeve, nut, and tail of FIG. 5 before the moulded plastic has cooled; and (*b*) is a partial cross-sectional view as in FIG. 7(*a*) but when the moulded plastic has cooled causing shrinkage of the plastic.
Figure 7B:
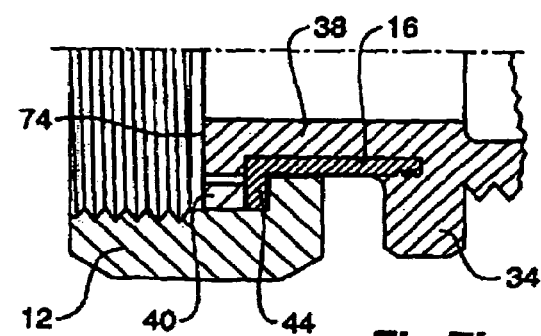

One of the problems often encountered in moulding plastics is shrinkage. Where the plastic shrinks in one direction and does not encounter any resistance, only its size is reduced. However, the addition of a sleeve results in the plastic encountering resistance when shrinking in the longitudinal direction of the stem. For that reasons it is advantageous to construct a die so that when the plastic is still hot, the inner diameter of the stem 74 projects further outwardly into the nut 12 than the flange 40, as shown in FIG. 7(a). As the plastic cools, this portion 74 of the stem 38 retracts into the tail 30 whilst the flange 40 of the tail 30 is prevented from retracting due to the sleeve flange 44. Since the amount of shrinkage can be pre-determined moulding a tail whose shape whilst hot is as in FIG. 7(a) can result in the cooled shape being as illustrated in FIG. 7(b).

Those skilled in the art will now appreciate that the nut 12 can slidably move alongside the outer surface 42 of the sleeve 16. The sleeve 16 is typically made from metal such as brass, thereby providing strength to the assembly against any lateral forces.

It has been found that there is no tendency for adhesion or fusion to occur between the surfaces of the nut, sleeve, and tail, and upon shrinkage of the tail under cooling, the nut has been found to be freely rotatable about the tail. Since the surfaces are generally circular, there is very good surface to surface contact as the nut is tightened when in use.

It is to be understood that reference to flange throughout the description typically includes an annular flange.

The present invention provides of a nut and tail assembly that having a resilient sleeve, provides an assembly that withstands lateral forces whilst being manufacturable without expensive weld and inspection operations, at the same time reducing overall cost.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

The invention claimed is:

1. A nut and tail assembly including:
   a longitudinal cylindrical hollow body having a first end, said body being substantially rigid and including an outwardly extending stop located inwardly from said first end, said body further having an outstanding flange at the second end thereof, said stop and flange defining therein-between a cavity sliding surface generally parallel to the longitudinal body; and wherein said body first end includes a plurality of external threads;
   a circular longitudinal sleeve extending along said sliding surface and being fixedly connected to said body;
   a nut slidably engaged with said sleeve; said nut having a first end and an inward flange at the other end, said nut inward flange extending into said body cavity and being of an interior diameter sufficient to be able to slide on said sleeve; and wherein said interior diameter is smaller than an external diameter of the stop and of one of an external diameter of the outstanding flange and a portion of the sleeve; whereby said inward flange is slidably retained between the outstanding flange and the stop, thus substantially preventing the nut from disengaging from the body.

2. A nut and tail assembly as in claim 1, wherein said nut includes a plurality of internal threads at said first end.

3. A nut and tail assembly as in claim 1 wherein said sleeve is manufactured from metal.

4. A nut and tail assembly as defined in claim 3, wherein said body is manufactured from polymeric plastic.

5. A nut and tail assembly as in claim 1 wherein located in between said sleeve and said external threads is a torque converter to assist in controlling the rotational motion of the body including said tail and sleeve.

6. A nut and tail assembly including:
a substantially rigid longitudinal cylindrical hollow body having a first end, said body including an outwardly extending stop located inwardly from said first end, said body further having an outstanding flange at the second end thereof, said stop and flange defining therein between a cavity sliding surface generally parallel to the longitudinal body;
a circular longitudinal sleeve extending along said sliding surface and having a radial flange at a first end thereof, said radial flange abutting against said outstanding flange and said sleeve being fixedly connected to said body at a second end thereof; and wherein said sleeve second end extends into said body; and
a nut slidably engaged with said sleeve and having a first end and an inward flange at the other end, said nut inward flange extending into said body cavity and being of a diameter to be able to slide on said sleeve, said diameter of the inward flange further being smaller than an external diameter of the stop and of one of the radial flange and outstanding flange, whereby the nut is substantially prevented from disengaging from the body.

7. A nut and tail assembly as in claim 6 wherein said sleeve second end includes at least one groove wherein said groove assists in longitudinally anchoring said sleeve in said body.

8. A nut and tail assembly as in claim 6 wherein said body is manufactured from polymeric plastic.

9. A nut and tail assembly as defined in claim 8, wherein said sleeve is manufactured from metal.

10. A nut and tail assembly as in claim 6 including a gasket housed within said nut and abutting against said body outstanding flange.

11. A nut and tail assembly as defined in claim 6, wherein said body first end includes a plurality of external threads.

12. A nut and tail assembly including:
a substantially rigid longitudinal cylindrical hollow body having a first end, said body including an outwardly extending stop located inwardly from said first end, said body further having an outstanding flange at the second end thereof, said stop and flange defining therein between a cavity sliding surface generally parallel to the longitudinal body;
a circular longitudinal sleeve extending along said sliding surface and having a radial flange at a first end thereof, said radial flange abutting against said outstanding flange and said sleeve being fixedly connected to said body at a second end thereof; and wherein said sleeve includes projections extending longitudinally outwardly from said radial flange and toward said outstanding flange; and
a nut slidably engaged with said sleeve and having a first end and an inward flange at the other end, said nut inward flange extending into said body cavity and being of a diameter to be able to slide on said sleeve, said diameter of the inward flange further being smaller than an external diameter of the stop and of one of the radial flange and outstanding flange, whereby the nut is substantially prevented from disengaging from the body.

13. A nut and tail assembly as in claim 12 wherein said projections are located symmetrically and circumferentially on said radial flange.

14. A nut and tail assembly as in claim 13 wherein there are least four said projections.

15. A nut and tail assembly as in claim 12 wherein said sleeve second end includes at least one groove wherein said groove assists in longitudinally anchoring said sleeve in said body.

* * * * *